United States Patent
Yamada

(10) Patent No.: US 9,469,175 B2
(45) Date of Patent: Oct. 18, 2016

(54) SHOCK ABSORBER SYSTEM

(71) Applicant: TOYOTA JIDOSHA KABUSHIKI KAISHA, Toyota-shi, Aichi-ken (JP)

(72) Inventor: Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 14/734,900

(22) Filed: Jun. 9, 2015

(65) Prior Publication Data

US 2015/0367701 A1 Dec. 24, 2015

(30) Foreign Application Priority Data

Jun. 24, 2014 (JP) .................................. 2014-129231

(51) Int. Cl.
*B60G 17/015* (2006.01)
*B60G 17/08* (2006.01)

(52) U.S. Cl.
CPC ............ *B60G 17/015* (2013.01); *B60G 17/08* (2013.01); *B60G 2400/102* (2013.01); *B60G 2400/202* (2013.01); *B60G 2400/252* (2013.01); *B60G 2500/10* (2013.01); *B60G 2800/244* (2013.01); *B60G 2800/246* (2013.01)

(58) Field of Classification Search
CPC .............................. B60G 17/015; B60G 17/08
See application file for complete search history.

(56) References Cited

U.S. PATENT DOCUMENTS

2006/0119064 A1* 6/2006 Mizuno ................ B60G 17/056
  280/124.157
2010/0013174 A1* 1/2010 Buma ................ B60G 17/0157
  280/5.507

FOREIGN PATENT DOCUMENTS

JP  H10-100634 A  4/1998
JP  2003-011635 A  1/2003

* cited by examiner

*Primary Examiner* — Calvin Cheung
(74) *Attorney, Agent, or Firm* — Oliff PLC

(57) ABSTRACT

A shock absorber system installed on a vehicle having four wheels in which a VSC control for giving a braking force to any of the wheels is to be executed to reduce an improper turning behavior of the vehicle due to an excessive side slip of any of the wheels, including: four hydraulic shock absorbers each configured to generate a damping force with respect to a relative movement of a corresponding sprung and unsprung portion and having a damping-force changer configured to change the damping force; and a controller configured to control the damping force by controlling the damping-force changer and configured such that, when the improper turning behavior of the vehicle occurs, the controller executes a reduction control in which the damping force to be generated by at least one of the four shock absorbers is controlled to reduce the improper turning behavior.

7 Claims, 7 Drawing Sheets

SHOCK ABSORBER SYSTEM

CROSS REFERENCE TO RELATED APPLICATION

The present application claims priority from Japanese Patent Application No. 2014-129231, which was filed on Jun. 24, 2014, the disclosure of which is herein incorporated by reference in its entirety.

BACKGROUND OF THE INVENTION

1. Field of the Invention

The present invention relates to a shock absorber system for vehicles in which a damping force to be generated by each hydraulic shock absorber is changeable.

2. Description of the Related Art

An understeer condition and an oversteer condition of a vehicle exceeding a certain extent are well known as "improper turning behaviors" due to an excessive side slip of any of four wheels of the vehicle. The following Patent Literatures propose changing the damping force to be generated by each shock absorber so as to reduce the conditions.
Patent Literature 1: JP-A-10-100634
Patent Literature 2: JP-A-2003-11635

SUMMARY OF THE INVENTION

Various ideas for reducing the improper turning behavior through the use of shock absorbers have been proposed, and there remains plenty of room for improvement in the technique of reducing the improper turning behavior by shock absorbers. In the meantime, there is executed, in many vehicles, "VSC control" in which a braking force is applied to any of wheels for preventing or reducing the improper turning behavior. In the vehicles in which the VSC control is executed, it is sometimes preferable to execute a control for reducing the improper turning behavior by shock absorbers with consideration given to the VSC control. Thus, some improvement to the technique of reducing the improper turning behavior by shock absorbers leads to improvement in the utility of the shock absorber system. It is therefore an object of the present invention to provide a shock absorber system having high utility.

To achieve the object indicated above, the present invention provides a shock absorber system installed on a vehicle in which the VSC control is to be executed and in which there is executed, prior to execution of the VSC control, a control for reducing the improper turning behavior by controlling the damping force to be generated by each shock absorber.

In a vehicle on which the shock absorber system according to the present invention is installed, the improper turning behavior is reduced to a certain extent prior to execution of the VSC control. Further, the VSC control is executed in a state in which the improper turning behavior is somewhat reduced, so that the executed VSC control is proper, in other words, timing of initiation of the VSC control can be made proper, for instance. In this specification, turning of the vehicle may be regarded as cornering of the vehicle.
Forms of the Invention There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and an embodiment. It is to be further understood that, as long as the claimable invention is construed in this way, any form in which one or more constituent elements is/are added to or deleted from any one of the following forms may be considered as one form of the claimable invention.

The following form (1) is a basis of the claimable invention. A form in which other form is added to the form (1) corresponds to a form of the claimable invention. A combination of the form (1) and the form (2) corresponds to claim 1. The forms (3)-(8) directly or indirectly depending from the form (2) correspond to claims 2-7, respectively.

(1) A shock absorber system installed on a vehicle having four wheels, comprising:

four hydraulic shock absorbers which are provided for the respective four wheels and each of which is disposed between a corresponding sprung portion and a corresponding unsprung portion of the vehicle, each of the four hydraulic shock absorbers being configured to extend and contract in accordance with a relative movement of the sprung portion and the unsprung portion in an up-down direction and to generate a damping force with respect to the relative movement, each of the four hydraulic shock absorbers having a damping-force changer configured to give a resistance to a flow of a working fluid caused by the relative movement and to change a magnitude of the resistance so as to change the damping force; and a controller configured to control the damping force to be generated by each of the four hydraulic shock absorbers by controlling the damping-force changer of each of the four hydraulic shock absorbers, wherein the controller is configured such that, when there occurs an improper turning behavior of the vehicle due to an excessive side slip of any of the four wheels, the controller executes a reduction control in which the damping force to be generated by at least one of the four hydraulic shock absorbers is controlled to reduce the improper turning behavior.

As explained above, this form is a basis of the claimable invention. The expression "improper turning behavior" in this form includes a condition in which an understeer condition or an oversteer condition is beyond a certain extent, namely, includes an excessive understeer condition and an excessive oversteer condition, for instance.

(2) The shock absorber system according to the form (1), which is installed on a vehicle in which a VSC control for giving a braking force to any of the four wheels is to be executed to reduce the improper turning behavior, wherein the controller is configured to execute the reduction control prior to execution of the VSC control.

In this form, the reduction control is executed by the hydraulic shock absorbers (hereinafter simply referred to as "absorbers" where appropriate) prior to execution of the so-called VSC control (Vehicle Stability Control). In other words, when the improper turning behavior whose extent is not as high as an extent that the VSC control needs to be executed occurs, the reduction control by the absorbers is executed. According to this form, it is thus possible to reduce the improper turning behavior at a relatively early stage of turning of the vehicle. In the reduction control, it is at least required to control the damping force to be generated by at least one of the four absorbers. The control of the damping force by the absorbers when the VSC control is being executed is not limited to a particular control. For instance, the reduction control may be continued, the control in the normal condition may be executed, or another control different from those may be executed.

In this form, the VSC control need not be necessarily executed following the reduction control by the absorbers. That is, when the improper turning behavior is cancelled by the reduction control and when the improper turning behavior whose extent does not require execution of the VSC control is maintained, the VSC control need not be executed. When the reduction control by the absorbers is continued in a situation in which the VSC control is executed following the reduction control, the improper turning behavior is restrained or reduced by both of the reduction control and the VSC control, whereby the effect of restraining or reducing the improper turning behavior becomes high. Further, the reduction control by the absorbers eliminates a need of execution of the VSC control until the lateral acceleration of the vehicle becomes considerably high in turning, so that timing of initiation of the VSC control can be properly set.

(3) The shock absorber system according to the form (2), which is installed on the vehicle in which the VSC control is initiated when a turning-condition indicating amount indicative of a condition of a turning behavior of the vehicle exceeds a first set amount, wherein the controller executes the reduction control when the turning-condition indicating amount exceeds a second set amount that is set so as to be nearer to an ideal turning behavior than the first set amount.

This form limits a relationship between timing of initiation of the reduction control by the absorbers and timing of initiation of the VSC control. According to this form, the VSC control can be initiated at proper timing after the reduction control by the absorbers. The term "turning-condition indicating amount" in this form is a parameter which may be referred to as "drift value", for instance. The turning-condition indicating amount includes, as representative examples, an operation amount of a steering operating member such as a steering wheel or the like and a deviation of an actual yaw rate from a theoretical yaw rate estimated from a vehicle speed or the like, i.e., a yaw rate deviation. The turning-condition indicating amount is not limited to the yaw rate deviation, but may include a deviation from each of theoretical values such as the lateral acceleration, a slip angle, and a speed of change in the slip angle, and may include a parameter in which the deviations and the yaw rate deviation are combined.

(4) The shock absorber system according to any one of the forms (1)-(3), wherein the controller is configured to execute, as the reduction control, an understeer-condition control in which the damping force to be generated by one of the four hydraulic shock absorbers corresponding to a front one of the four wheels that is located on an outer side when the vehicle turns is made smaller than the damping force to be generated in a normal condition, so as to reduce an understeer condition of the vehicle as the improper turning behavior.

In this form, limitation is added to the way of the reduction control by the absorbers in the understeer condition in which the improper turning behavior is beyond a certain extent. It is generally desirable to increase a cornering force on the front-wheel side for reducing the understeer condition. According to this form, the load of the vehicle body shared by the front wheel located on the outer side when the vehicle turns is prevented from becoming excessively large, and the cornering force on the front-wheel side is thereby increased. As a result, the understeer condition can be reduced. In this respect, a decrease in the damping force for the front wheel located on the inner side when the vehicle turns also contributes to an increase in the cornering force on the front-wheel side. In view of this, the damping force for the front wheel located on the inner side when the vehicle turns may be made small in the reduction control. Ordinary vehicles are generally designed such that, when a vehicle turns, the vehicle takes a posture in which the vehicle body plunges forward in a direction inclined relative to the longitudinal direction of the vehicle body toward the outer side with respect to turning, the posture being desirable in terms of drivability or the like of the vehicle. For achieving such a posture, it is desirable not to decrease the damping force for the front wheel located on the inner side when the vehicle turns.

The term "normal condition" in this form means a condition in which the reduction control is not being executed. In other words, when any control of the damping force is being normally executed, a condition in which the control is being executed corresponds to the normal condition. The arrangement in which "the damping force is made smaller than the damping force to be generated in the normal condition" according to this form and the arrangement in which "the damping force is made larger than the damping force to be generated in the normal condition" according to the following form are not limited to particular arrangements, but may include the following arrangements, for instance:

(a) an arrangement in which, when the damping force in the normal condition is defined as a normal damping force, there is generated a damping force smaller or larger than the normal damping force;

(b) an arrangement in which there is generated a damping force having a magnitude obtained by subtracting or adding a certain magnitude of damping force (which may be either fixed or variable) from or to the damping force to be generated in the damping-force control in the normal condition; and (c) an arrangement in which there is generated a damping force which is the smallest or the largest within a range of the damping force to be generated by the absorber in question.

In a strict sense, the damping force depends on a speed of the relative movement of the sprung portion and the unsprung portion in the up-down direction. (The speed will be hereinafter referred to as "sprung-unsprung relative speed" or "stroke speed" where appropriate). In view of this, the concepts such as "magnitude of the damping force" and "to change the damping force" may be interpreted as concepts "damping coefficient" as the damping-force generating characteristic of the absorber in question and "to change the damping coefficient", respectively.

(5) The shock absorber system according to the form (4), wherein the controller is configured such that, in the understeer-condition control, the damping force to be generated by one of the four hydraulic shock absorbers corresponding to a front one of the four wheels that is located on an inner side when the vehicle turns is made larger than the damping force to be generated in the normal condition and the damping force to be generated by another one of the four hydraulic shock absorbers corresponding to a rear one of the four wheels located on the outer side when the vehicle turns is made larger than the damping force to be generated in the normal condition.

This form promotes realization of the above-indicated posture in which the vehicle body plunges forward in the direction inclined relative to the longitudinal direction of the vehicle body. Further, the shared load of the vehicle body on the outer side with respect to turning can be made relatively small, so that the posture of the vehicle body when the vehicle turns can be maintained in a relatively good condition. (Here, the posture of the vehicle body is a concept that can be represented by a roll angle of the vehicle body, for instance.) In view of the road holding ability of the rear wheel located on the inner side in turning when the vehicle takes the above-indicated posture in which the vehicle body plunges forward in the inclined direction, the damping force to be generated by one of the four absorbers that corresponds to the rear wheel located on the inner side in turning is desirably made smaller than the damping force to be generated in the normal condition in this form.

(6) The shock absorber system according to any one of the forms (1)-(5), wherein the controller is configured to execute, as the reduction control, an oversteer-condition control in which the damping force to be generated by each of two of the four hydraulic shock absorbers corresponding to front two of the four wheels is made larger than the damping force to be generated in a normal condition, so as to reduce an oversteer condition of the vehicle as the improper turning behavior.

In this form, limitation is added to the way of the reduction control by the absorbers in the oversteer condition in which the improper turning behavior is beyond a certain extent. In general, the sum of the cornering force that acts on the right wheel and the cornering force that acts on the left wheel decreases with an increase in a shift amount of the load to one of the right and left wheels, namely, with an increase in a difference in the shared load of the vehicle body between the left wheel and the right wheel. Conversely, the sum of the cornering forces increases with a decrease in the shift amount of the load. According to this form, the shift amount on the front-wheel side increases, so that the sum of the cornering forces of the front right and front left wheels is decreased. Consequently, the cornering force on the front-wheel side, namely, the side force that acts on the front-wheel side, can be made relatively small, whereby the oversteer condition can be reduced.

(7) The shock absorber system according to the form (6), wherein the controller is configured such that, in the oversteer-condition control, the damping force to be generated by each of two of the four hydraulic shock absorbers corresponding to rear two of the four wheels is made smaller than the damping force to be generated in the normal condition.

This form prevents the sum of the cornering forces of the rear right and rear left wheels from being decreased, so that a decrease in the cornering force on the rear-wheel side, namely, a decrease in the side force that acts on the rear-wheel side, can be made relatively small. Consequently, the oversteer condition can be further reduced. In this form, the shift of the shared load of the vehicle body toward the outer side with respect to turning can be made relatively small, whereby the posture of the vehicle body when the vehicle turns can be maintained in a relatively good condition.

(8) The shock absorber system according to any one of the forms (1)-(7), wherein the controller is configured to control, in a normal condition, the damping force to be generated by each of the four hydraulic shock absorbers based on at least one of a sprung speed that is a speed of the sprung portion in the up-down direction and sprung acceleration that is acceleration of the sprung portion in the up-down direction, so as to reduce a vibration of the sprung portion.

The sprung speed and the sprung acceleration are good indices of the damping force to be generated for damping the movement of the sprung portion in the up-down direction. According to this form, a vibration of the sprung portion can be damped in the normal condition with high efficiency, so that good riding comfort is ensured.

(11) The shock absorber system according to any one of the forms (1)-(8), wherein the damping-force changer has a valve mechanism configured to give a resistance to the flow of the working fluid and a solenoid configured to apply, to the valve mechanism, a force that depends on an electromagnetic force so as to change a valve opening pressure of the valve mechanism, the damping-force changer being configured to change the damping force in accordance with an electric current to be supplied to the solenoid.

In this form, the structure of the damping-force changer is limited. There may be employed a damping-force changer configured to change the damping force to be generated by changing a cross-sectional area of a fluid passage through which the working fluid flows, i.e., a cross-sectional area of an orifice, for instance. Unlike the damping-force changer having such a structure, the damping-force changer of this form includes the so-called poppet valves. In other words, the damping-force changer of this form includes a valve configured to be opened by a difference in the pressure of the working fluid between the front side and the rear side of the valve, namely, on the upstream side and the downstream side in the direction in which the working fluid flows, and the valve opening pressure is changed by changing the electric current supplied to the solenoid, whereby the damping force to be generated is changed. The thus constructed damping-force changer has a good response of the change in the damping force with respect to the change in the supply current, so that the reduction control by the absorbers are particularly effectively executable.

(12) The shock absorber system according to the form (11), wherein the damping-force changer has (a) a main fluid passage through which the working fluid flows, (b) a main valve provided in the main fluid passage as the valve mechanism, (c) a bypass fluid passage provided so as to bypass the main valve, and (d) a pilot chamber provided in the bypass fluid passage and configured to apply, to the main valve, an internal pressure that acts in a direction to close the main valve, and (e) a pilot valve configured to change the internal pressure of the pilot chamber in accordance with the electric current to be supplied to the solenoid, and wherein the damping-force changer is configured to change a valve opening pressure of the main valve by a change in the internal pressure of the pilot chamber by the pilot valve.

In this form, the structure of the damping-force changer is further limited. This form achieves, in a relatively simple structure, the hydraulic shock absorbers having a characteristic that a gradient according to which the damping force changes relative to a change in a stroke speed when the stroke speed is low is made different from a gradient according to which the damping force changes relative to a change in the stroke speed when the stroke speed is high.

BRIEF DESCRIPTION OF THE DRAWINGS

The objects, features, advantages, and technical and industrial significance of the claimable invention will be better understood by reading the following detailed description of an embodiment of the claimable invention, when considered in connection with the accompanying drawings, in which:

DETAILED DESCRIPTION OF THE EMBODIMENT

Figure 1:
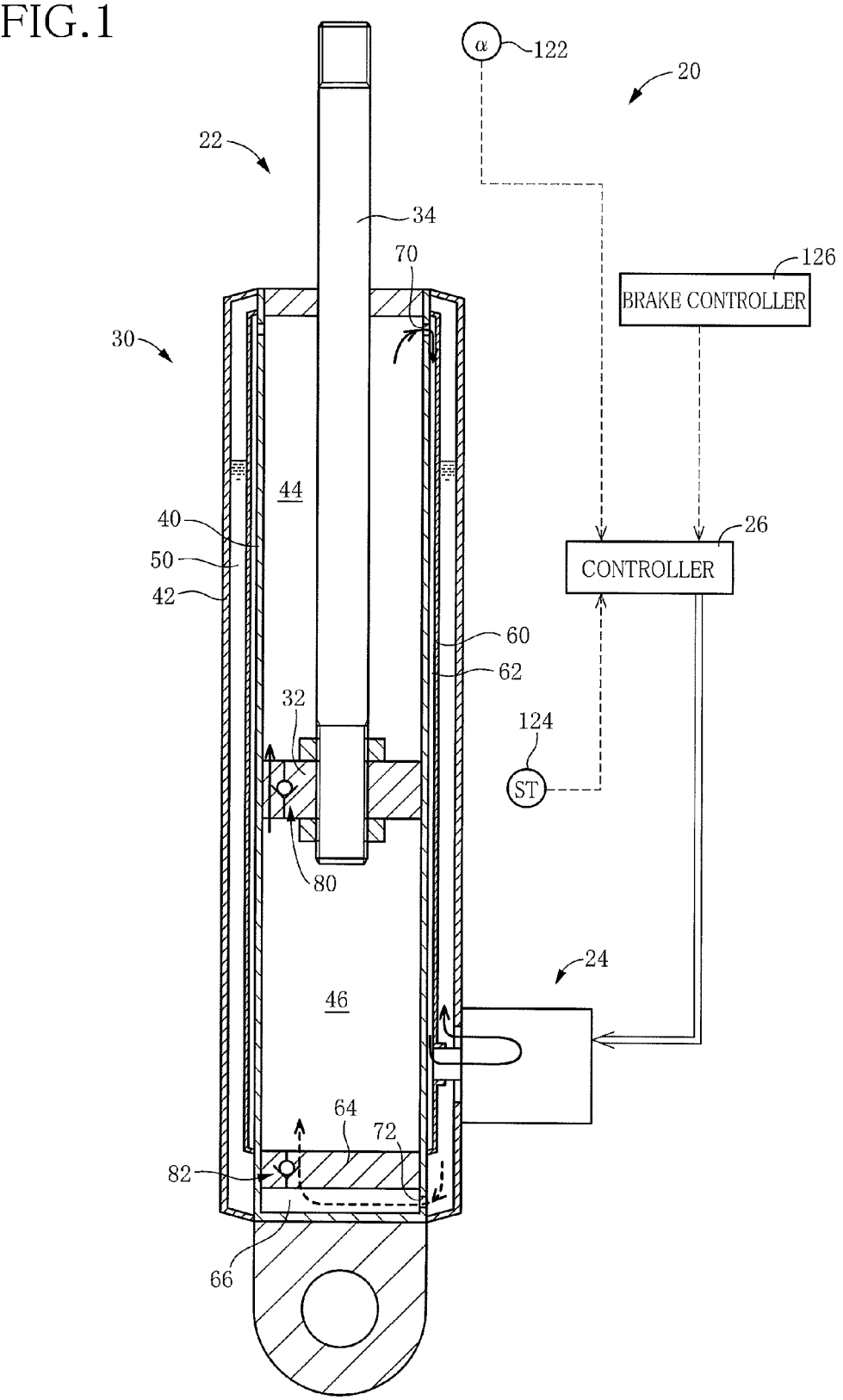
FIG. 1 is a view showing an overall structure of a shock absorber system according to one embodiment.

Referring to the drawings, there will be explained below in detail a shock absorber system according to one embodiment of the claimable invention. It is to be understood that the claimable invention is not limited to the details of the following embodiment and the forms described in Forms of the Invention, but may be embodied with other changes and modifications based on the knowledge of those skilled in the art.

Embodiment

1. Overall Structure of Shock Absorber System

As shown in FIG. 1, a shock absorber system 20 (hereinafter simply referred to as "absorber system 20" where appropriate) according to one embodiment has a hydraulic shock absorber 22 of a cylinder type (hereinafter simply referred to as "absorber 22" where appropriate) as a main constituent element. The absorber 22 has a damping-force changer 24 configured to generate a damping force with respect to a movement of the absorber 22 and to change the magnitude of the damping force. The absorber system 20 has a controller 26 as a control device for controlling the damping-force changer 24. A vehicle on which the absorber system 20 is installed has four wheels, i.e., a front right wheel, a front left wheel, a rear right wheel, and a rear left wheel. While not shown, the absorber system 20 has four absorbers 22 provided for the respective four wheels. Each absorber 22 connects a corresponding sprung portion and a corresponding unsprung portion of the vehicle. Four damping-force changers 24 provided for the respective four absorbers 22 are controlled by one controller 26 that functions as a common controller.

The absorber 22 has a housing 30, a piston 32 disposed in the housing 30 so as to be movable in the up-down direction, and a rod 34 having one end portion (lower end portion) connected to the piston 32 and another end portion (upper end portion) extending upward from the housing 30. The housing 30 is connected at its lower end portion to a lower arm as the unsprung portion, and the upper end portion of the rod 34 is connected to a mount portion of a body of a vehicle as the sprung portion. That is, the absorber 22 extends and contracts when the sprung portion and the unsprung portion move relative to each other in the up-down direction. Specifically, the absorber 22 extends when the sprung portion and the unsprung portion move relative to each other in a direction away from each other (hereinafter referred to as "in the rebound movement" or "when the sprung portion and the unsprung portion rebound" where appropriate). The absorber 22 contracts when the sprung portion and the unsprung portion move relative to each other in a direction toward each other (hereinafter referred to as "in the bound movement" or "when the sprung portion and the unsprung portion bound" where appropriate).

The housing 30 has a generally twin-tube structure and includes a main tube 40 having a closed end and an outer tube 42 disposed radially outwardly of the main tube 40. The piston 32 is slidably disposed in the main tube 40. The piston 32 partitions an interior of the main tube 40 into two fluid chambers, i.e., a rod-side chamber 44 through which the rod 34 extends and an opposite chamber 46 through which the rod 34 does not extend. Further, a buffer chamber (which may be referred to as "reservoir") 50 is defined between the main tube 40 and the outer tube 42. The buffer chamber 50 stores a working fluid.

An intermediate tube 60 is disposed in the housing 30 between the main tube 40 and the outer tube 42. An annular fluid passage 62 is defined between an inner circumferential surface of the intermediate tube 60 and an outer circumferential surface of the main tube 40. There is disposed, at an inner bottom portion of the main tube 40, a partition member 64 that defines the bottom of the opposite chamber 46. A bottom fluid passage 66 is formed between the partition member 64 and the bottom wall of the main tube 40.

A communication hole 70 is provided at an upper portion of the main tube 40 for fluid communication between the fluid passage 62 and the rod-side chamber 44. A bottom communication hole 72 is provided at a portion of the main tube 40 near to its lower end for fluid communication between the buffer chamber 50 and the bottom fluid passage 66.

As explained later in detail, the damping-force changer 24 permits passage, therethrough, of the working fluid that flows out of the rod-side chamber 44 and subsequently flows into the buffer chamber 50 via the fluid passage 62 and has a function to give a resistance to the flow of the working fluid.

In the bound movement, the working fluid initially flows into the rod-side chamber 44 from the opposite chamber 46 via a check valve 80 provided in the piston 32, as indicated by the solid line arrow in FIG. 1. Because the amount of the working fluid that flows into the rod-side chamber 44 is larger than the volume of the rod-side chamber 44 that is increased as a result of the movement of the piston 32, the working fluid initially flows out of the rod-side chamber 44 via the communication hole 70 and the fluid passage 62, then passes through the damping-force changer 24, and finally flows into the buffer chamber 50. In this instance, the absorber 22 generates a damping force with respect to contraction thereof, namely, a damping force with respect to the bound movement, by the resistance given to the flow of the working fluid that passes through the damping-force changer 24.

On the other hand, in the rebound movement, the working fluid initially flows out of the rod-side chamber 44 via the communication hole 70 and the fluid passage 62, then passes through the damping-force changer 24, and finally flows into the buffer chamber 50, as in the bound movement. In this instance, the absorber 22 generates a damping force with respect to extension thereof, namely, a damping force with respect to the rebound movement, by the resistance given to the flow of the working fluid that passes through the damping-force changer 24. In this instance, the working fluid flows into the opposite chamber 46 from the buffer chamber 50 via the bottom communication hole 72, the bottom fluid passage 66, and a check valve 82 provided in the partition member 64, as indicated by the dashed line arrow in FIG. 1.

2. Structure of Damping-Force Changer

There will be hereinafter explained a structure of the damping-force changer 24. Because there are known damping-force changers having a structure similar to that of the damping-force changer 24 (such as the one disclosed in JP-A-2011-132995), the structure of the damping-force changer 24 will be explained briefly.

Figure 2:
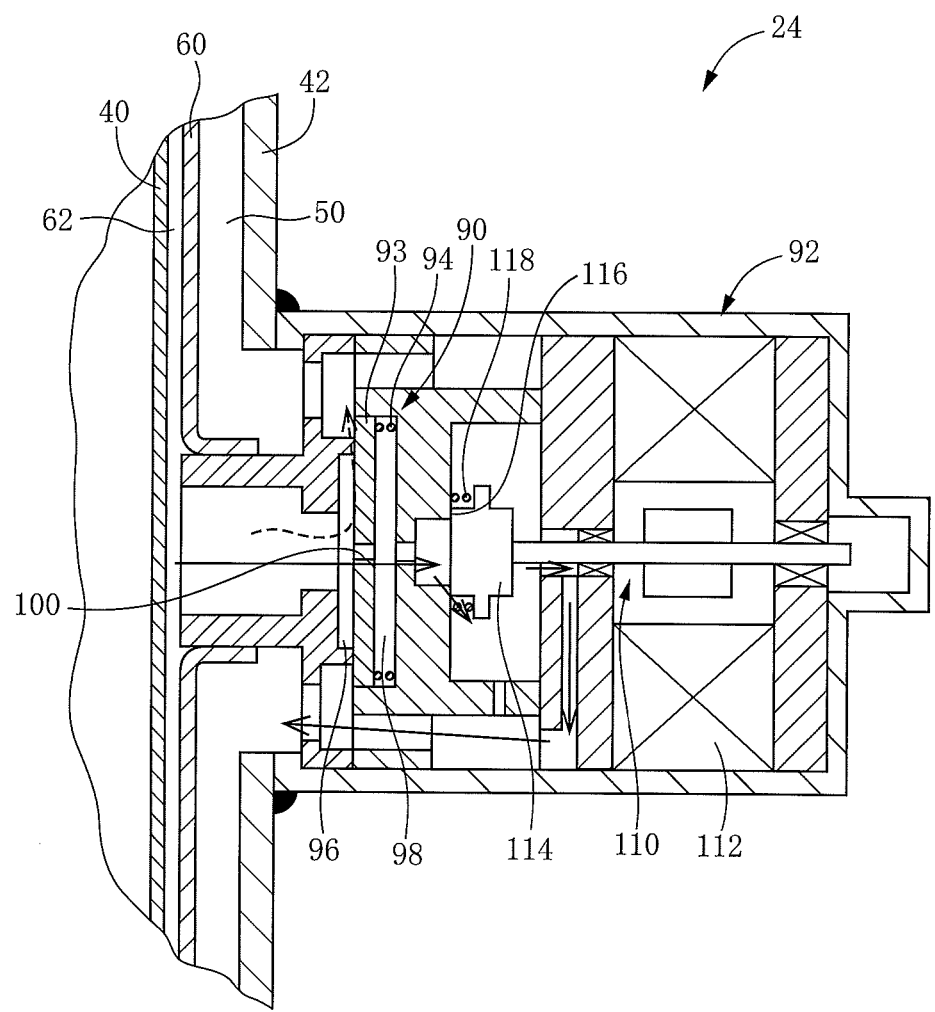
FIG. 2 is a cross-sectional view showing a structure of a damping-force changer of the shock absorber system according to the embodiment.

As shown in FIG. 2, the damping-force changer 24 has a main valve 90 as a valve mechanism for giving the resistance to the working fluid passing therethrough and a solenoid valve 92 for adjusting a valve opening pressure of the main valve 90. In this respect, each of the two valves 90, 92 is the so-called poppet valve.

A valve plate 93 of the main valve 90 is biased by a compression coil spring 94 functioning as a biasing (urging) member in a direction in which the valve plate 93 is seated. A force that acts on the valve plate 93 due to a difference between a fluid pressure in a high-pressure chamber 96 located on a front side of the valve plate 93 (i.e., on a left side of the valve plate 93 in FIG. 2) and a fluid pressure in a low-pressure chamber 98 located on a rear side of the valve plate 93 (i.e., on a right side of the valve plate 93 in FIG. 2) opens the main valve 90 against a biasing force of the spring 94. (The force may be referred to as "pressure-difference acting force" where appropriate.) That is, as indicated by the dashed line arrow in FIG. 2, there is caused a flow of the working fluid from the fluid passage 62 to the buffer chamber 50, and the main valve 90 gives the resistance to the flow of the working fluid. In other words, the main valve 90 gives the resistance to the flow of the working fluid passing through a main fluid passage indicated by the broken line arrow.

The main valve 90 is provided with an orifice 100 for giving a resistance to a flow of the working fluid from the high-pressure chamber 96 to the low-pressure chamber 98. The working fluid that has passed through the orifice 100 flows into the buffer chamber 50, as indicated by the solid line arrow in FIG. 2. That is, the fluid passage indicated by the solid line arrow is a bypass fluid passage that bypasses the main valve 90, and the working fluid flows also into the buffer chamber 50 through the bypass fluid passage.

The solenoid valve 92 has a movable member 110 and a coil 112 configured to generate, by energization, an electromagnetic force for moving the movable member 110. A valve head 114 is provided at a distal end of the movable member 110. The valve head 114 is configured to be seated on and separated away from a valve seat 116, thereby opening and closing the low-pressure chamber 98. The movable member 110 is biased by a compression coil spring 118 in a direction in which the valve head 114 is separated away from the valve seat 116. While it may be difficult to understand because of omission of illustration of the structure, there acts, on the movable member 110, a biasing force in a direction in which the valve head 114 is seated on the valve seat 116 by energization of the coil 112. That is, the movable member 110 and the coil 112 constitute a solenoid for seating the valve head 114 on the valve seat 116.

The thus constructed solenoid valve 92 can adjust an opening degree of the low-pressure chamber 98, namely, an outflow amount of the working fluid from the low-pressure chamber 98 into the buffer chamber 50. That is, the solenoid valve 92 can adjust a fluid pressure in the low-pressure chamber 98 and thereby adjust the valve opening pressure of the main valve 90. In this respect, the valve opening pressure of the main valve 90 depends on an amount of an electric current supplied to the coil 112. With an increase in the electric current, the opening degree of the solenoid valve 92 with respect to the low-pressure chamber 98 becomes low, the fluid pressure in the low-pressure chamber 98 becomes high, and the valve opening pressure of the main valve 90 becomes high. That is, with an increase in the electric current, the resistance to the flow of the working fluid that flows into the buffer chamber 50 via the main valve 90 becomes large.

Concerning the structure of the damping-force changer 24, the main valve 90 is a valve disposed in the main fluid passage, the low-pressure chamber 98 functions as a pilot chamber provided in the bypass fluid passage and configured to apply an internal pressure to the main valve 90 in a direction to close the main valve 90, and the solenoid valve 92 functions as a pilot valve configured to change the internal pressure of the pilot chamber.

In the thus constructed damping-force changer 24, when a speed $v_{ST}$ of a relative movement of the sprung portion and the unsprung portion in the up-down direction (hereinafter, referred to as "stroke speed $v_{ST}$" where appropriate) is low, the main valve 90 is not opened, and a damping force F generated by the absorber 22 generally depends on the resistance to the flow of the working fluid that passes through the orifice 100 formed in the main valve 90. When the difference between the fluid pressure in the high-pressure chamber 96 and the fluid pressure in the low-pressure chamber 98 becomes large and the main valve 90 is accordingly opened, the damping force F generally depends on the resistance to the flow of the working fluid that passes through the main valve 90. As described above, the valve opening pressure of the main valve 90 becomes high and the damping force F generally becomes high with an increase in the electric current supplied to the coil 112.

3. Characteristic of Damping Force Generated by Hydraulic Shock Absorber

Figure 3:
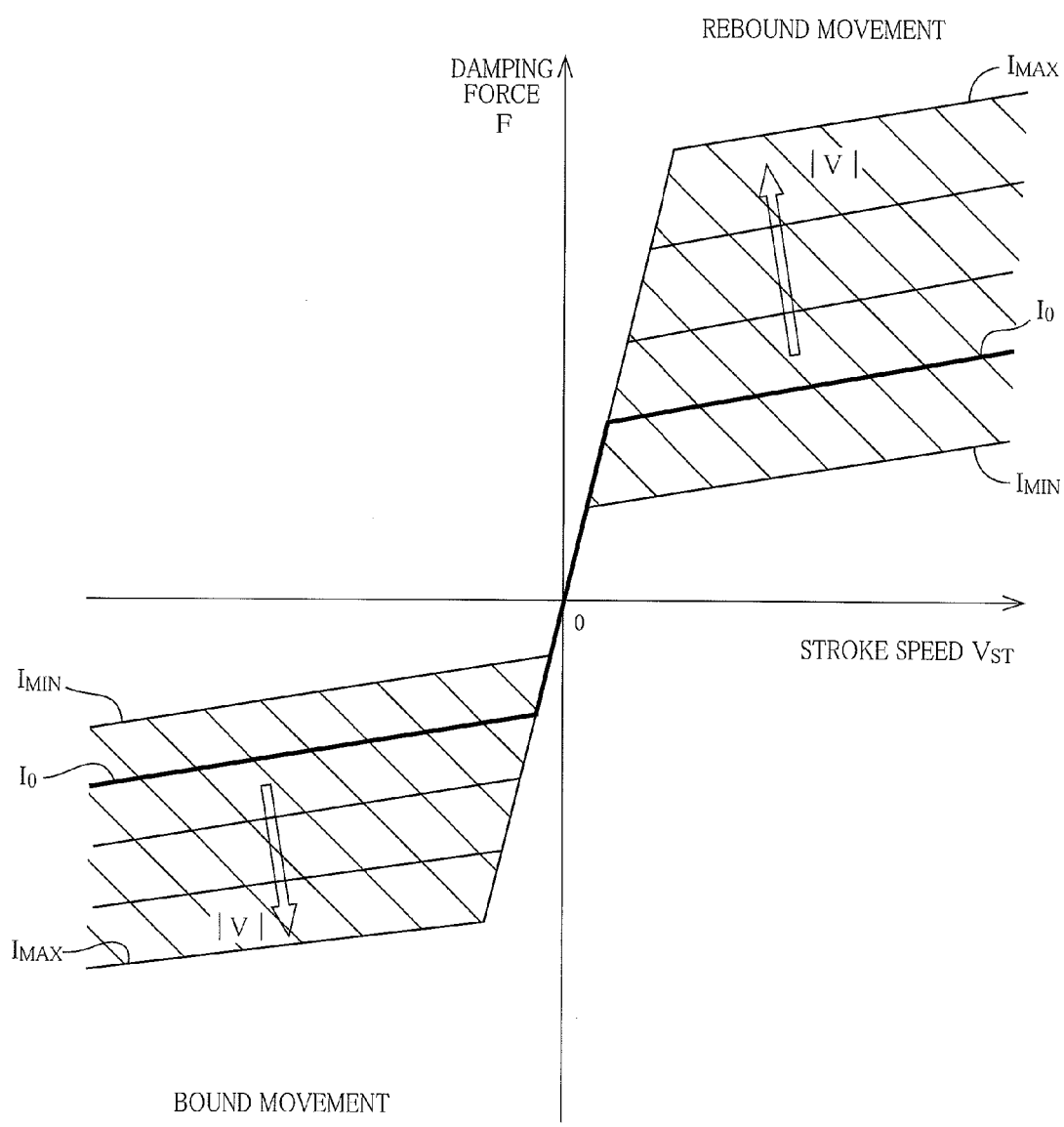
FIG. 3 is a graph showing a damping-force characteristic of the shock absorber system according to the embodiment.

As explained above, the absorber system 20 is configured such that the working fluid flows into the buffer chamber 50 through the damping-force changer 24 both of when the absorber 22 extends and when the absorber 22 contracts and such that the damping-force changer 24 gives the resistance to the flow of the working fluid, whereby the absorber 22 generates the damping force with respect to both of extension and contraction thereof. The characteristic of the damping force, namely, the magnitude of the damping force with respect to an extension speed and a contraction speed of the absorber 22, is illustrated by the graph of FIG. 3. It is noted that the extension speed and the contraction speed of the absorber 22 may be regarded so as to be equal to the stroke speed $v_{ST}$, namely, a relative speed of the sprung portion and the unsprung portion in the up-down direction. In view of this, the damping-force characteristic is illustrated as a graph (FIG. 3) representing the magnitude of the damping force F with respect to the stroke speed $v_{ST}$.

In the graph of FIG. 3, a positive value of the stroke speed $v_{ST}$ represents a speed when the absorber 22 extends, i.e., a speed in the rebound movement while a negative value of the stroke speed $v_{ST}$ represents a speed when the absorber 22 contracts, i.e., a speed in the bound movement. Further, a positive value of the damping force F represents a force in a direction against extension, i.e., a force in a bound direction while a negative value of the damping force F represents a force in a direction against contraction, i.e., a force in a rebound direction. The first quadrant in the graph of FIG. 3 represents a damping-force characteristic with respect to the rebound movement, and the third quadrant in the graph of FIG. 3 represents a damping-force characteristic with respect to the bound movement. Further, the graph of FIG. 3 shows the damping-force characteristics in different values of electric current supplied to the coil 112 of the damping-force changer 24. In the following explanation, the following concepts "the stroke speed $v_{ST}$ is high", "the stroke speed $v_{ST}$ is low", "the damping force F is large", and "the damping force F is small" are concepts that do not depend on a direction of the stroke speed $v_{ST}$ and a direction of the damping force F unless otherwise specified. In other words, the above concepts are based on absolute values of the stroke speed $v_{ST}$ and absolute values of the damping force F.

The damping-force characteristic indicated by the bold solid line in the graph of FIG. 3 is the damping-force characteristic when a normal current $I_0$ is supplied to the coil 112. The characteristic will be explained in relation to the structure of the damping-force changer 24. When the stroke speed $v_{ST}$ is low, the main valve 90 is not opened, and the damping force F depends on the resistance to the flow of the working fluid passing through the orifice 100 of the main valve 90. When the stroke speed $v_{ST}$ becomes high, the pressure difference between the high-pressure chamber 96 and the low-pressure chamber 98 becomes large and the main valve 90 is accordingly opened. Consequently, the damping force F depends on the resistance to the flow of the working fluid passing through the main valve 90. In each characteristic line in FIG. 3, a point at which the gradient changes is a point at which the main valve 90 starts to be opened. As apparent from the shape of each characteristic line, the characteristic is established such that the gradient according to which the damping force F changes relative to a change in the stroke speed $v_{ST}$ when the stroke speed $v_{ST}$ is low and the gradient according to which the damping force F changes relative to a change in the stroke speed $v_{ST}$ when the stroke speed $v_{ST}$ is high are mutually different in association with the opening of the main valve 90.

As explained above, the valve opening pressure of the main valve 90 becomes high with an increase in an electric current I supplied to the coil 112. In the absorber system 20, the damping-force changer 24 is configured such that the magnitude of the damping force F to be generated is changeable within a hatched range in the graph of FIG. 3. Specifically, the current I to be supplied to the coil 112 is changeable within a range defined by a maximum current $I_{MAX}$ and a minimum current $I_{MIN}$ with the normal current $I_0$ interposed therebetween, and the characteristic of the damping force F to be generated is changeable within the range. The amount of flow of the working fluid passing through the damping-force changer 24 (the speed of the flow of the working fluid passing through the damping-force changer 24) in the rebound movement and the amount of flow of the working fluid (the speed of the flow of the working fluid) in the bound movement are different even at the same stroke speed $V_{ST}$. In view of this, the normal current $I_0$, the maximum current $I_{MAX}$, and the minimum current $I_{MIN}$ are set individually for the rebound movement and for the bound movement.

In terms of the function of the damping-force changer 24 described above, the damping-force changer 24 functions as a damping-force characteristic changer for changing the characteristic of the damping force generated by the absorber 22. In other words, the damping-force changer 24 may be regarded as having a function of changing a damping coefficient of the absorber 22. The damping-force changer 24 is configured to change the damping force not by changing a cross-sectional area of the orifice, but by adjusting the valve opening pressure, thereby enabling execution of the damping-force control with high controllability and high response.

4. Control of Damping Force Generated by Hydraulic Shock Absorber

There will be hereinafter explained a control of the damping force generated by each absorber 22. Initially, a control in a normal condition will be explained, and an improper turning behavior of a vehicle and a relationship between the improper turning behavior and a VSC control will be subsequently explained. Then a reduction control by the absorber system 20 will be explained. Thereafter, a process of a control of the absorbers 22 will be explained.

(a) Control in Normal Condition

In the absorber system 20, a normal-condition control, namely, a control in a normal condition in which any improper turning behavior is not occurring, is executed while placing importance on damping of a vibration of the sprung portion. Specifically, a sprung speed v is employed as a damping-force index for determining the damping force to be generated by the absorber 22, and the control is executed based on the sprung speed v such that the damping force to be generated increases with an increase in the sprung speed v. That is, the control close to the so-called skyhook damper theory is executed.

Referring to FIG. 3, the control in normal condition will be specifically explained. When the sprung speed v is equal to 0 (v=0), a supply current I corresponding to the above-indicated normal current $I_0$ is supplied to the damping-force changer 24 such that the absorber 22 generates a normal damping force. Here, it is defined that the sprung portion moves upward when the sprung speed v is larger than 0 (v>0) while the sprung portion moves downward when the sprung speed v is smaller than 0 (v<0). In the rebound movement, when the sprung speed v is larger than 0 (v>0), a larger supply current I is supplied to the damping-force changer 24 with an increase in the absolute value |v| of the sprung speed. In the bound movement, when the sprung speed v is smaller than 0 (v<0), a larger supply current I is supplied to the damping-force changer 24 with an increase in the absolute value |v| of the sprung speed. In short, with an increase in the sprung speed v, the supply current I to be supplied becomes large and the magnitude of the damping force F generated by the absorber 22 becomes large.

The absorber 22 is configured to generate the damping force with respect to the relative movement of the sprung portion and the unsprung portion. Therefore, when the sprung speed v is smaller than 0 (v<0) in the rebound movement and when the sprung speed v is larger than 0 (v>0) in the bound movement, it is impossible to apply, to the sprung portion, a force functioning as a resistance to the movement of the sprung portion. That is, the damping force F generated by the absorber 22 functions as a force to propel the movement of the sprung portion. In these instances, the supply current I corresponding to the minimum current $I_{MIN}$ is supplied to the damping-force changer 24, and the damping force F to be generated by the absorber 22 is minimized.

In the control described above, the sprung speed v is employed as the damping-force index. The sprung acceleration α or other indices based on the sprung speed v and the sprung acceleration α may be employed as the damping-force index, for instance. Specifically, there may be executed a control in which the damping force F increases with an increase in the sprung acceleration α, for instance.

Figure 4A:
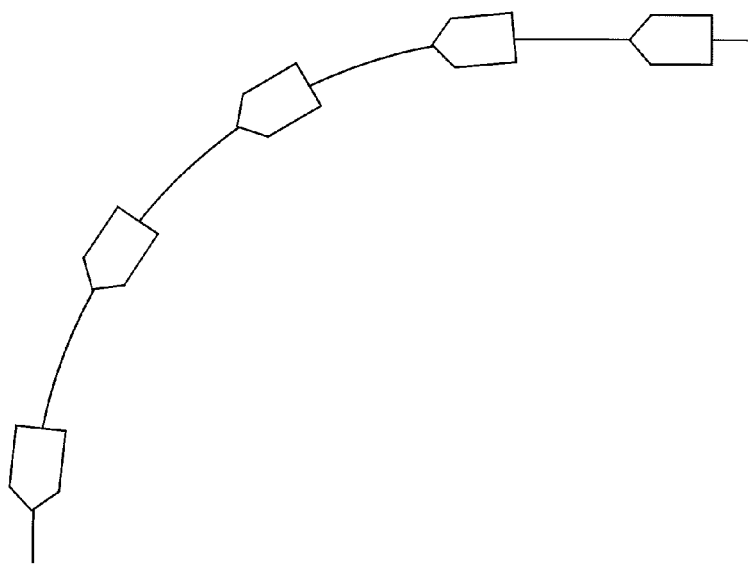
FIGS. 4A and 4B are schematic views each for explaining a behavior of a vehicle when the vehicle turns.
Figure 4B:
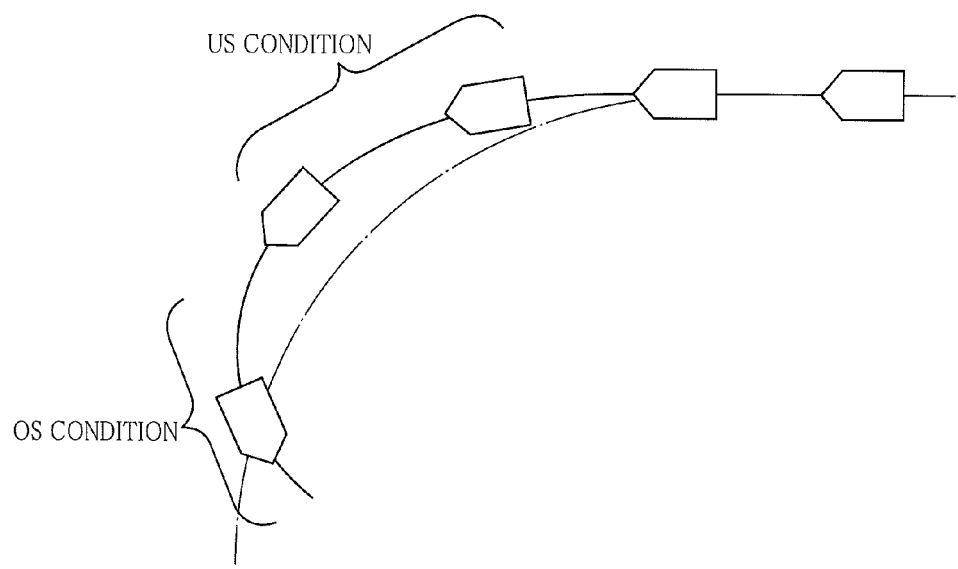

(b) Improper Turning Behavior of Vehicle and Relationship Between Improper Turning Behavior and VSC Control The vehicle turns as shown in FIG. 4A when the vehicle turns according to a proper turning behavior while the vehicle turns as shown in FIG. 4B when the vehicle turns according to an improper turning behavior. The turning of the vehicle shown in FIG. 4B may occur in a situation in which a vehicle running speed (vehicle speed) is too high or a situation in which the friction coefficient of a road surface on which the vehicle runs is low, for instance. In the turning shown in FIG. 4B, the vehicle is placed in an excessive understeer condition (hereinafter referred to as "US condition" where appropriate) from an early stage of turning to a middle stage of turning and is thereafter placed in an excessive oversteer condition (hereinafter referred to as "OS condition" where appropriate). In FIG. 4B, the long dashed short dashed line indicates a running line of the vehicle when the vehicle turns according to the proper turning behavior.

In the excessive US condition, the radius of turning is excessively larger than the radius of turning estimated from a steering operation amount (steered angle). The excessive US condition is a behavior that arises mainly from an excessive side slip of the font wheels. The excessive OS condition is caused when a vehicle driver increases the steering operation amount, namely, when the vehicle driver further steers, for eliminating the excessive US condition, for instance. The excessive OS condition is an improper turning behavior in which the radius of turning is excessively smaller than the radius of turning estimated from the steering operation amount (steered angle). The excessive OS condition is a behavior that arises mainly from an excessive side slip of the rear wheels.

In the vehicle on which the absorber system 20 is installed, the so-called VSC control is executable. The VSC control causes a brake device of any of the four wheels to be automatically operated for preventing or reducing the excessive US condition and the excessive OS condition. Because the VSC control is a well-known control, it will be briefly explained. For reducing the excessive US condition by the VSC control, the output of the engine is reduced in accordance with the degree of the US condition and the braking force is applied to the front wheel and the rear wheel located on an inner side when the vehicle turns, namely, located nearer to the center of turning and to the front wheel located on an outer side when the vehicle turns, namely, located more distant from the center of turning, so as to decrease the side force. On the other hand, for reducing the excessive OS condition by the VSC control, the braking force is applied to the front wheel and the rear wheel located on the outer side when the vehicle turns, so as to generate moment toward the outer side with respect to turning.

Determination whether the VSC control is executed is made based on a drift value which is one example of a turning-condition indicating amount. The drift value Dv generally corresponds to a yaw rate deviation of the vehicle, namely, a deviation of an actual yaw rate from a theoretical yaw rate estimated based on the steering operation amount and the vehicle speed. In turning of the vehicle according to the proper behavior, namely, in ideal turning, the drift value Dv changes in accordance with a change in lateral acceleration $G_Y$ of the vehicle, as indicated by the long dashed short dashed line in the graph of FIG. 5.

Figure 5:
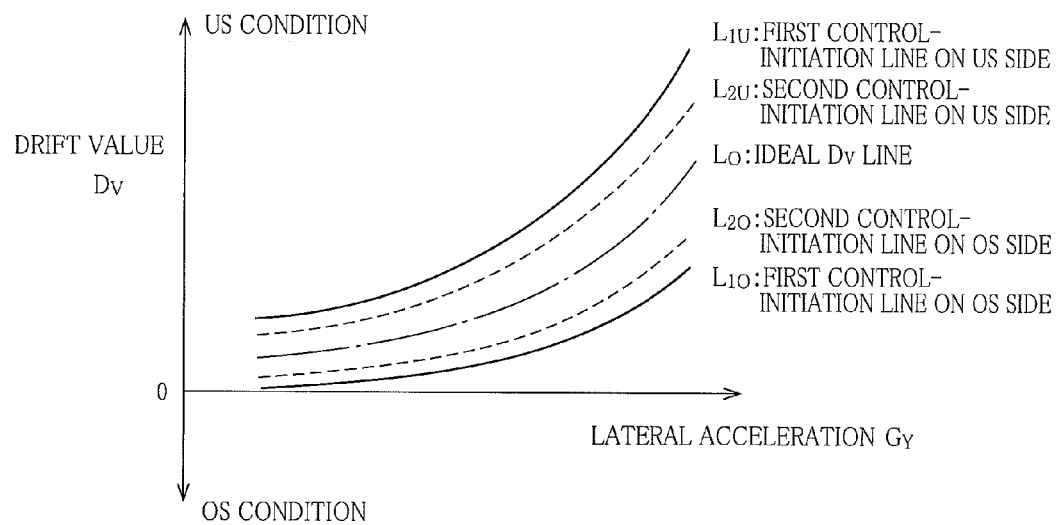
FIG. 5 is a graph for explaining a change in a drift value in ideal turning and requirements for initiation of a VSC control and initiation of a reduction control.

In the graph of FIG. 5, the region in which Dv>0 is a region of the US condition in a strict sense while the region in which Dv<0 is a region of the OS condition in a strict sense. In turning of the vehicle, the side force is generated due to the side slip of any of the wheels. As indicated by a line $L_O$ indicating a change in the drift value Dv in ideal turning (hereinafter referred to as "ideal Dv line $L_O$" where appropriate), the drift value Dv is a value indicative of the US condition, in a strict sense, even in ideal turning and is a value indicative of a larger extent of the US condition, namely, indicative of a higher degree of understeer tendency, with an increase in the lateral acceleration $G_Y$. In view of this, the term "excessive OS condition" in the specification means an excessive oversteer tendency with respect to ideal turning. Therefore, the term "excessive OS condition" may be regarded as the US condition in a strict sense even in the excessive OS condition. In this sense, "excessive US condition" and "excessive OS condition" may be regarded as "condition in which the understeer tendency is excessively high with respect to ideal turning" and "condition in which the oversteer tendency is excessively high with respect to the ideal turning, respectively.

As apparent from FIG. 5, two first control-initiation lines $L_1$ each indicated by the solid line are set with the ideal Dv line $L_O$ interposed therebetween. The upper one of the two lines is a first control-initiation line on the US side $L_{1U}$ on which the VSC control is initiated for reducing the excessive US condition while the lower one of the two lines is a first control-initiation line on the OS side $L_{1O}$ on which the VSC control is initiated for reducing the excessive OS condition. When the drift value Dv deviates from the ideal Dv line $L_O$ and subsequently crosses these lines, the VSC control is initiated. In other words, when the drift value Dv as one example of the turning-condition indicating amount exceeds a first set amount defined by each first control-initiation line $L_1$, the VSC control is initiated.

(c) Reduction Control by Shock Absorber System

Figure 6:
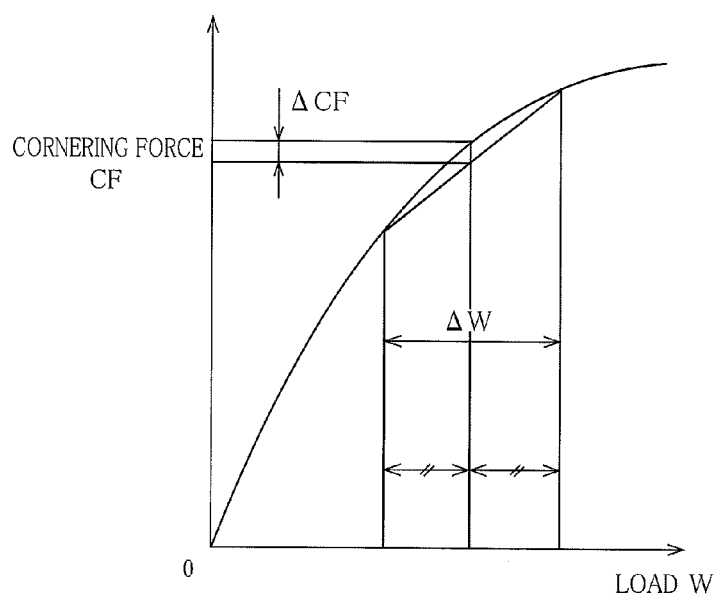
FIG. 6 is a graph for explaining a decrease in a cornering force due to a difference in a shared load between a right wheel and a left wheel.

In the absorber system 20, the reduction control is executed prior to execution of the VSC control explained above. In the reduction control, the damping force to be generated by each of the absorbers 22 is controlled so as to reduce the excessive US condition and the excessive OS condition. In this respect, the reduction control is based on a theory that a cornering force CF is decreased with an increase in a difference in a shared load of the vehicle body between the right wheel and the left wheel. As apparent from FIG. 6 showing a relationship between shared load W and cornering force CF, a gradient of increase of the cornering force CF becomes smaller with an increase in the shared load W, namely, the curved line indicative of the relationship becomes convex upward. Consequently, a sum of the cornering forces CF generated in the right and left wheels is decreased with an increase in the difference ΔW in the shared load between the right wheel and the left wheel. That is, the average of the cornering forces CF generated in the right and left wheels decreases by a difference ΔCF shown in the graph of FIG. 6 with respect to the cornering force CF generated in one wheel when there exist no difference in the shared load between the right wheel and the left wheel. The reduction control is executed based on the theory.

As shown in FIG. 5, two second control-initiation lines $L_2$ each indicated by the dashed line are set such that each second control-initiation lines $L_2$ is interposed between the ideal Dv line $L_0$ and a corresponding one of the two first control-initiation lines $L_1$. Specifically, a second control-initiation line on the US side $L_{2U}$ is set between the ideal Dv line $L_0$ and the first control-initiation line on the US side $L_{1U}$, and a second control-initiation line on the OS side $L_{2O}$ is set between the ideal Dv line $L_0$ and the first control-initiation line on the OS side $L_{1O}$. When the drift value Dv deviates from the ideal Dv line $L_0$ and crosses the second control-initiation line on the US side $L_{2U}$, a reduction control for reducing the excessive US condition (hereinafter referred to as "understeer-condition control" where appropriate) is executed. When the drift value Dv deviates from the ideal Dv line $L_0$ and crosses the second control-initiation line on the OS side $L_{2O}$, a reduction control for reducing the excessive OS condition (hereinafter referred to as "oversteer-condition control" where appropriate) is executed. In other words, when the drift value Dv as one example of the turning-condition indicating amount exceeds a second set amount defined by each second control-initiation line $L_2$ such that the second set amount is set so as to be nearer to the ideal turning behavior than the first set amount, the reduction control is executed, thereby reducing the excessive US condition or the excessive OS condition whose extent is not as high as an extent that the VSC control needs to be executed.

Figure 7A:
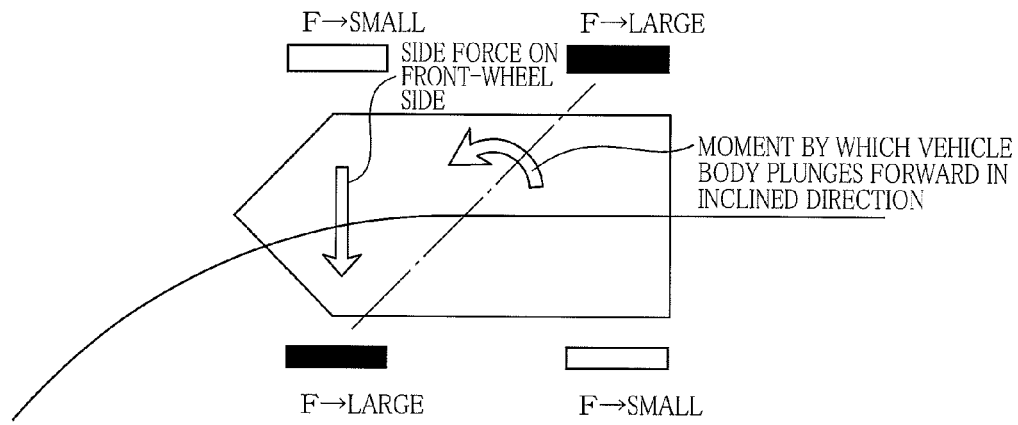
FIGS. 7A and 7B are schematic views each for explaining how damping force of each hydraulic shock absorber is generated in the reduction control.

In the understeer-condition control, the damping force F to be generated by the absorber 22 corresponding to the front wheel positioned on the outer side with respect to turning is made smaller than the damping force to be generated in the normal condition, as shown in FIG. 7A. In addition, the damping force F to be generated by the absorber 22 corresponding to the front wheel positioned on the inner side with respect to turning is made larger than the damping force to be generated in the normal condition, and the damping force F to be generated by the absorber 22 corresponding to the rear wheel positioned on the outer side with respect to turning is made larger than the damping force to be generated in the normal condition. Further, the damping force F to be generated by the absorber 22 corresponding to the rear wheel positioned on the inner side with respect to turning is made smaller than the damping force in the normal condition. Specifically, the maximum current $I_{MAX}$ indicated above is supplied to the damping-force changer 24 of each absorber 22 whose damping force is made larger, and the absorber 22 generates a maximum damping force within a range that the absorber 22 can generate. On the other hand, the minimum current $I_{MIN}$ indicated above is supplied to the damping-force changer 24 of each absorber 22 whose damping force is made smaller, and the absorber 22 generates a minimum damping force within a range that the absorber 22 can generate.

According to the understeer-condition control, the damping force to be generated by the absorber 22 corresponding to the front wheel located on the outer side when the vehicle turns is made smaller, and the load shared by the front wheel located on the outer side when the vehicle turns can be prevented from becoming excessively large. Consequently, the cornering force on the front-wheel side becomes large, and the understeer condition is reduced. Further, the damping force to be generated by each of the absorbers 22 corresponding to the front wheel located on the outer side when the vehicle turns and the rear wheel located on the outer side when the vehicle turns is made larger. Consequently, when the vehicle turns, the vehicle is apt to take a posture in which the vehicle body plunges forward in a direction inclined relative to the longitudinal direction of the vehicle body, the posture being desirable in terms of drivability or the like of the vehicle. As a result, the vehicle can turn in good posture. In addition, the damping force to be generated by the absorber 22 corresponding to the rear wheel located on the inner side when the vehicle turns is made smaller, ensuring a good road holding ability of the wheel in the posture in which the vehicle body plunges forward in the inclined direction relative to the longitudinal direction of the vehicle body. According to the understeer-condition control, the excessive US condition is reduced and the vehicle is apt to take the posture in which the vehicle body plunges forward in the inclined direction, at an early stage of turning, namely, at an initial stage of the US condition.

Figure 7B:
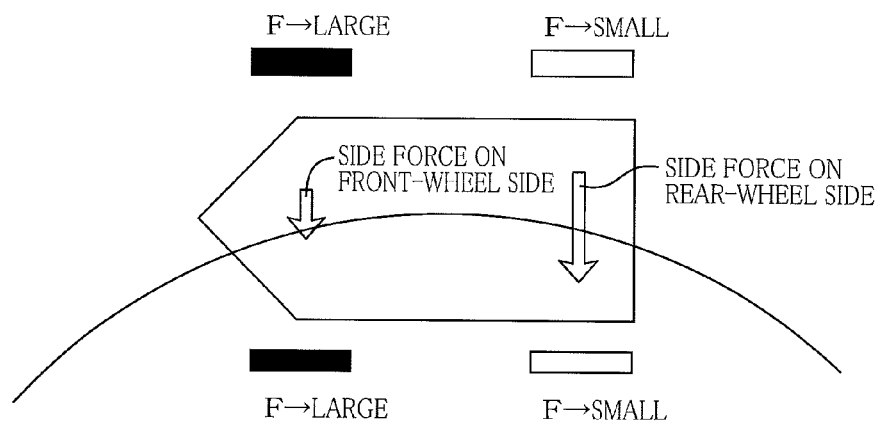

In the oversteer-condition control, the damping force F to be generated by each of the two absorbers 22 corresponding to the respective two front wheels is made larger than the damping force to be generated in the normal condition, as shown in FIG. 7B. In addition, the damping force F to be generated by each of the two absorbers 22 corresponding to the two rear wheels is made smaller than the damping force to be generated in the normal condition. As in the understeer-condition control, the maximum current $I_{MAX}$ indicated above is supplied to the damping-force changer 24 of each absorber 22 whose damping force is made larger, and the absorber 22 generates a maximum damping force within a range that the absorber 22 can generate. On the other hand, the minimum current $I_{MIN}$ indicated above is supplied to the damping-force changer 24 of each absorber 22 whose damping force is made smaller, and the absorber 22 generates a minimum damping force within a range that the absorber 22 can generate.

According to the oversteer-condition control, the damping force to be generated by each of the two absorbers 22 corresponding to the front wheels is made larger, so that the difference in the shared load between the front right wheel and the front left wheel becomes large and the cornering force on the front-wheel side, namely, the side force acting on the front-wheel side, becomes relatively small. It is consequently possible to reduce the excessive OS condition. In addition, the damping force to be generated by each of the two absorbers 22 corresponding to the rear wheels is made smaller, so that the difference in the shared load between the rear right wheel and the rear left wheel becomes small and a decrease in the cornering force on the rear-wheel side, namely, a decrease in the side force acting on the rear-wheel side, becomes relatively small. It is consequently possible to reduce the excessive OS condition. In contrast to the increase in the damping force to be generated by each of the two absorbers 22 corresponding to the front wheels, the damping force to be generated by each of the two absorbers 22 corresponding to the rear wheels is decreased, so that the vehicle body is kept in a relatively good posture in turning.

In the reduction control explained above, the maximum current $I_{MAX}$ is supplied when the damping force to be generated by the absorber 22 is made large while the minimum current $I_{MIN}$ is supplied when the damping force to be generated by the absorber 22 is made small. Instead, an intermediate current between: the normal current $I_0$ for generating the normal damping force in the normal-condition control; and the maximum current $I_{MAX}$ may be supplied for thereby increasing the damping force to be generated by the absorber 22 or an intermediate current between: the normal current $I_0$; and the minimum current $I_{MIN}$ may be supplied for thereby decreasing the damping force to be generated by the absorber 22. The damping force to be generated by the absorber 22 may be increased or decreased by supplying a current obtained by adding or subtracting a fixedly or variably set current value to or from the current I to be supplied in normal-condition control, for instance.

(d) Process of Control

Figure 8:
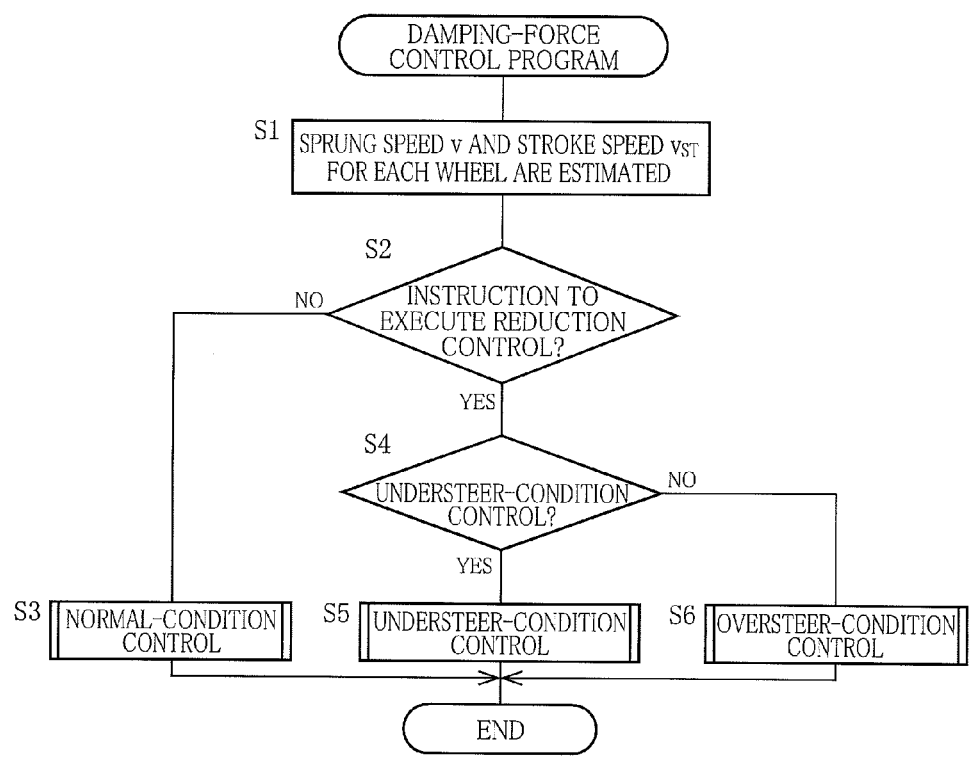
FIG. 8 is a flow chart showing a damping-force control program for controlling the damping force of each hydraulic shock absorber.

The control of the damping force generated by the absorber 22 is executed such that the controller 26 executes a the damping-force control program indicated by the flow chart of FIG. 8 at a short time pitch from several μsec to several tens of μsec., for instance. Referring to the flow hart, the process of the control of the damping force will be concretely explained.

In processing according to the damping-force control program, the sprung speed v and the stroke speed $v_{ST}$ are initially estimated for each of the four wheels at Step 1 (hereinafter abbreviated as "S1" and other steps will be similarly abbreviated). Specifically, a sprung acceleration sensor 122 for detecting the sprung acceleration α and a stroke sensor 124 for detecting the stroke position ST that are provided for each of the four wheels are connected to the controller 26, as shown in FIG. 1, and the sprung speed v and the stroke speed $v_{ST}$ are estimated for each wheel based on: the stroke position ST and the sprung acceleration α detected by the corresponding sensors 122, 124; and the stroke position ST and the sprung acceleration α detected in previous execution of the program.

Subsequently, it is determined at S2 whether the reduction control is instructed to be executed. Initiation of execution of the VSC control and initiation of execution of the reduction control are determined by a brake controller configured to control each brake device. There is connected, to the brake controller, an operation-angle sensor for detecting an operation angle of the steering wheel, a speed sensor for detecting the speed of the vehicle, a lateral-acceleration sensor for detecting the lateral acceleration $G_Y$ of the vehicle, and a yaw-rate sensor for detecting the yaw rate of the vehicle. The brake controller calculates the drift value Dv as one example of the turning-condition indicating amount on the basis of the values detected by the sensors, and it is determined whether the drift value Dv exceeds the first set amount defined by each first control-initiation line $L_1$ and the second set amount defined by each second control-initiation line $L_2$ as explained above.

As shown in FIG. 1, a brake controller 126 can communicate with the controller 26 by an in-vehicle LAN (CAN). When the drift value Dv exceeds the second set amount, the brake controller 126 transmits, to the controller 26, the fact that the drift value Dv is over the second set amount and whether the vehicle is in the excessive US condition or the excessive OS condition, namely, transmits an instruction as to which one of the understeer-condition control and the oversteer-condition control is to be executed. It is determined at S2 whether the instruction has been sent from the brake controller 126.

When no instruction to execute the reduction control has been sent from the brake controller 126, the normal-condition control is executed at S3. Specifically, the supply currents I to be supplied to the damping-force changers 24 of the respective four absorbers 22 are determined based on the sprung speeds v and the stroke speeds $v_{ST}$ estimated at S1 as explained above, and the determined supply currents I are supplied to the respective damping-force changers 24.

When the instruction to execute the reduction control has been sent from the brake controller 126, it is determined at S4 whether the instruction instructs execution of the understeer-condition control. When the instruction instructs execution of the understeer-condition control, the understeer-condition control explained above is executed at S5. On the other hand, when the instruction from the brake controller 126 does not instruct execution of the understeer-condition control, namely, the instruction from the brake controller 126 instructs execution of the oversteer-condition control, the oversteer-condition control explained above is executed at S6.

In the process according to the damping-force control program described above, the understeer-condition control or the oversteer-condition control is executed even when the VSC control is being executed. Instead, the normal-condition control may be executed when the VSC control is being executed or another control different from the normal-condition control and the reduction control may be executed. In the process according to the damping-force control program, the reduction control is executed prior to execution of the VSC control. The reduction control may be executed irrespective of execution of the VSC control. That is, the absorber system 20 may be installed on vehicles in which the VSC control is not executed. Even in such an instance, the improper turning behavior is effectively reduced.

What is claimed is:

1. A shock absorber system installed on a vehicle which has four wheels and in which a VSC control for giving a braking force to any of the four wheels is to be executed to reduce an improper turning behavior of the vehicle due to an excessive side slip of any of the four wheels, comprising:

four hydraulic shock absorbers which are provided for the respective four wheels and each of which is disposed between a corresponding sprung portion and a corresponding unsprung portion of the vehicle, each of the four hydraulic shock absorbers being configured to extend and contract in accordance with a relative movement of the sprung portion and the unsprung portion in an up-down direction and to generate a damping force with respect to the relative movement, each of the four hydraulic shock absorbers having a damping-force changer configured to give a resistance to a flow of a working fluid caused by the relative movement and to change a magnitude of the resistance so as to change the damping force; and a controller configured to control the damping force to be generated by each of the four hydraulic shock absorbers by controlling the damping-force changer of each of the four hydraulic shock absorbers, wherein the controller is configured such that, when the improper turning behavior occurs, the controller executes, prior to execution of the VSC control, a reduction control in which the damping force to be generated by at least one of the four hydraulic shock absorbers is controlled to reduce the improper turning behavior.

2. The shock absorber system according to claim 1, which is installed on the vehicle in which the VSC control is initiated when a turning-condition indicating amount indicative of a condition of a turning behavior of the vehicle exceeds a first set amount, wherein the controller executes the reduction control when the turning-condition indicating amount exceeds a second set amount that is set so as to be nearer to an ideal turning behavior than the first set amount.

3. The shock absorber system according to claim 1, wherein the controller is configured to execute, as the reduction control, an understeer-condition control in which the damping force to be generated by one of the four hydraulic shock absorbers corresponding to a front one of the four wheels that is located on an outer side when the vehicle turns is made smaller than the damping force to be generated in a normal condition, so as to reduce an understeer condition of the vehicle as the improper turning behavior.

4. The shock absorber system according to claim 3, wherein the controller is configured such that, in the understeer-condition control, the damping force to be generated by one of the four hydraulic shock absorbers corresponding to a front one of the four wheels that is located on an inner side when the vehicle turns is made larger than the damping force to be generated in the normal condition and the damping force to be generated by another one of the four hydraulic shock absorbers corresponding to a rear one of the four wheels located on the outer side when the vehicle turns is made larger than the damping force to be generated in the normal condition.

5. The shock absorber system according to claim 1, wherein the controller is configured to execute, as the reduction control, an oversteer-condition control in which the damping force to be generated by each of two of the four hydraulic shock absorbers corresponding to front two of the four wheels is made larger than the damping force to be generated in a normal condition, so as to reduce an oversteer condition of the vehicle as the improper turning behavior.

6. The shock absorber system according to claim 5, wherein the controller is configured such that, in the oversteer-condition control, the damping force to be generated by each of two of the four hydraulic shock absorbers corresponding to rear two of the four wheels is made smaller than the damping force to be generated in the normal condition.

7. The shock absorber system according to claim 1, wherein the controller is configured to control, in a normal condition, the damping force to be generated by each of the four hydraulic shock absorbers based on at least one of a sprung speed that is a speed of the sprung portion in the up-down direction and sprung acceleration that is acceleration of the sprung portion in the up-down direction, so as to reduce a vibration of the sprung portion.

\* \* \* \* \*